United States Patent
Fukuda et al.

(10) Patent No.: US 8,073,407 B2
(45) Date of Patent: Dec. 6, 2011

(54) RADIO COMMUNICATION DEVICE AND POWER SUPPLYING METHOD FOR RADIO COMMUNICATION DEVICE

(75) Inventors: Atsushi Fukuda, Yokosuka (JP); Hiroshi Okazaki, Zushi (JP); Shoichi Narahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 891 days.

(21) Appl. No.: 12/108,087

(22) Filed: Apr. 23, 2008

(65) Prior Publication Data

US 2008/0268796 A1    Oct. 30, 2008

(30) Foreign Application Priority Data

Apr. 27, 2007  (JP) .................. 2007-118049

(51) Int. Cl.
*H04B 1/04*  (2006.01)
(52) U.S. Cl. .................. 455/114.1; 455/126; 455/127.1
(58) Field of Classification Search .... 455/114.1–114.2, 455/126, 120, 127.1
See application file for complete search history.

(56) References Cited

U.S. PATENT DOCUMENTS

| | | | |
|---|---|---|---|
| 3,992,669 A | 11/1976 | Dades | |
| 5,270,719 A * | 12/1993 | Roth | ............................ 342/157 |
| 5,771,444 A | 6/1998 | Dent et al. | |
| 5,907,264 A | 5/1999 | Feldman | |
| 5,946,606 A * | 8/1999 | Shimizu | ..................... 455/67.11 |
| 6,108,313 A * | 8/2000 | Lee et al. | ....................... 370/294 |
| 6,298,223 B1 * | 10/2001 | Seow | .............................. 455/129 |
| 6,643,522 B1 * | 11/2003 | Young | ......................... 455/552.1 |
| 6,882,128 B1 | 4/2005 | Rahmel et al. | |
| 7,092,684 B2 * | 8/2006 | Szopko et al. | ............. 455/114.2 |
| 7,126,440 B2 * | 10/2006 | Bradley et al. | ................ 333/133 |
| 7,145,509 B2 | 12/2006 | Ikuta et al. | |
| 2004/0242166 A1 | 12/2004 | Ikuma | |
| 2008/0139128 A1 * | 6/2008 | Liao | ............................... 455/68 |

FOREIGN PATENT DOCUMENTS

| | | |
|---|---|---|
| CN | 1658432 A | 8/2005 |
| JP | 2-151130 | 6/1990 |
| JP | 9-116459 | 5/1997 |
| JP | 2000-295055 | 10/2000 |
| JP | 2005-287017 | 10/2005 |

OTHER PUBLICATIONS

Office Action issued May 24, 2011, in Japanese Patent Application No. 2007-118049 with English translation.

* cited by examiner

*Primary Examiner* — Christian Hannon
(74) *Attorney, Agent, or Firm* — Oblon, Spivak, McClelland, Maier & Neustadt, L.L.P.

(57) ABSTRACT

A radio communication device in which the output transmission signal of a high-frequency power amplifying part is sent out to an antenna via a circulator, a high-frequency signal reflected from the antenna is transferred via the circulator to a rectifying part to obtain a direct current power, and the direct current power is supplied to a power amplifying part or another constituent part in the radio communication device as an aid to the power supply from a power supply unit.

8 Claims, 5 Drawing Sheets

RADIO COMMUNICATION DEVICE AND POWER SUPPLYING METHOD FOR RADIO COMMUNICATION DEVICE

BACKGROUND OF THE INVENTION

1. Field of the Invention

The present invention relates to a radio communication device that converts reflected high-frequency signal power from an antenna into a direct current power and uses the converted electric power, and also to an electric power supplying method for the radio communication devices.

2. Description of the Related Art

In a transmitter of a portable radio communication terminal, matching circuits are designed to make impedance matching between a high-frequency power amplifier and an antenna in order to radiate power, which is outputted from the high-frequency power amplifier, efficiently from the antenna. However, because the impedance of the antenna changes depending on the way of holding by a user or a usage environment, power reflection from the antenna occurs.

As countermeasures to this problem, there exists a method of providing a controllable matching circuit between the high-frequency power amplifier and the antenna to make a reflected wave smaller (Patent literature 1), a method of canceling the reflected wave by a part of transmitting electric power (Patent literature 2), a method of canceling the reflected wave by using the reflected wave (Patent literature 3) and so on.

Patent literature 1: Japanese Patent Application Laid-open No. 2000-295055
Patent literature 2: Japanese Patent Application Laid-open No. H02-151130
Patent literature 3: Japanese Patent Application Laid-open No. H09-116459

Since a matching circuit with an impedance tuning function is added to the output side of the power amplifier in the method of Patent literature 1, a loss is given to a transmission signal. So, it is necessary to use a power amplifier capable of greater power amplification in order to transmit signals at a desired electric power, and it has a drawback of reducing efficiency. In the method of Patent literature 2, a part of the transmission power is used to cancel the reflected wave, so that efficiency deteriorates by that amount. In the method of Patent literature 3, an electric power for amplifying a part of the reflected wave is necessary, and the electric power efficiency of the entire portable radio communication device worsens.

SUMMARY OF THE INVENTION

It is an object of the present invention to provide a radio communication device capable of operating a high-frequency power amplifier in an optimum state and having high power utilization efficiency.

The radio communication device by the present invention comprises:
an antenna;
a high-frequency power amplifying part that supplies a transmission signal to said antenna;
a rectifying part that converts a high-frequency signal into a direct current power;
a circulator having a first port connected to the output of said high-frequency power amplifying part, a second port connected to said antenna and a third port connected to said rectifying part, and configured such that an input from the first port is outputted to the second port, and an input from the second port is outputted to the third port; and
a power supply unit that feeds electric power at least to said high-frequency power amplifying part;
wherein a direct current power from said rectifying part is supplied to at least one of said high-frequency power amplifying part and another constituent part in said radio communication device.

Since a leakage power to other ports occurs in an actual circulator, the radio communication device may be provided with a phase shifter that aligns the phase of a transmission signal reflected by the antenna with the phase of a transmission signal leaked from the 1st port to the 3rd port of the circulator, in phase, or adjusts the phases at least not to be in reverse relation to each other. In the case of using a plurality of carrier frequency bands, there may be provided multiple sets of the signal source, the amplifying part and the circulator.

In the case of using a plurality of antennas, a set of the signal source, the amplifying part, the circulator and the rectifying part may be provided for each antenna. In the case of using a plurality of antenna elements of the same frequency band such as those in an array antenna, a set of the signal source, the amplifying part, the circulator and the phase shifter connected to the 3rd port of the circulator may be provided for each antenna elements, and each phase shifter should only align the phases of transmission signals reflected by the antenna, in phase, or adjust the phases not to be in reverse relation to each other.

DETAILED DESCRIPTION

Description will be made below for the embodiments of the present invention. Note that the same reference numbers are applied to constituent parts having the same function and duplicate description may be omitted.

First Embodiment

Figure 1:
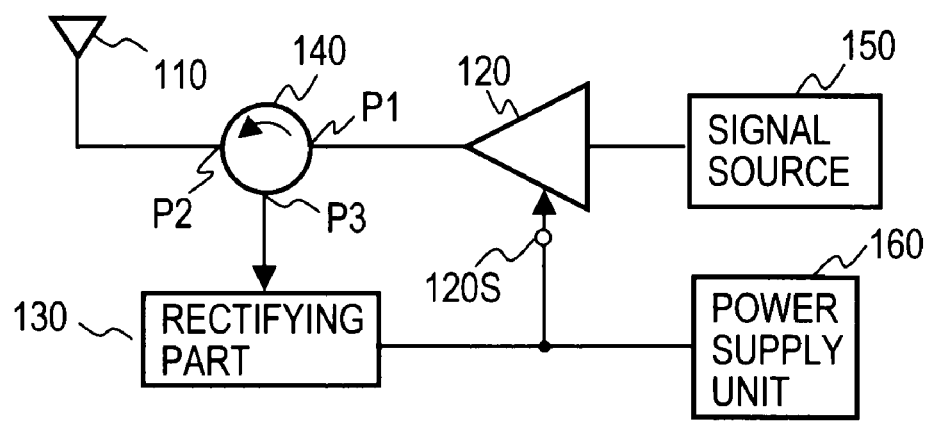
FIG. 1 shows a functional construction of a radio communication device according to a first embodiment.

FIG. 1 shows the functional constitution example of those parts related to the present invention of the radio communication device of the first embodiment. A radio communication device 100 has an antenna 110, a high-frequency power amplifying pail (hereinafter, also simply referred to as an amplifying part) 120 that supplies a transmission signal to the antenna 110, a rectifying part 130 that converts a high-frequency signal power into a direct current power, a circulator 140, a signal source 150 that generates a transmission signal, and a power supply unit 160.

The signal source 150 modulates an input voice signal to convert it into a high-frequency signal of a predetermined frequency band, for example. The amplifying part 120 power-amplifies the high-frequency signal given from the signal source 150 and provides the amplified high-frequency signal to the circulator 140. In the circulator 140, a 1st port P1 is connected to the output terminal of the amplifying part 120, a 2nd port P2 is connected to the antenna 110, and a 3rd port P3 is connected to the rectifying part 130. In general, a circulator transfers a signal input to a 1st port to a second port and a signal input to a 2nd port a 3rd port. Thus, the circulator 140 outputs the high frequency signal from the 1st port P1 to the 2nd port P2.

The antenna 110 reflects a portion of power of the high-frequency signal from the 2nd port P2 of the circulator 140 which in turn transfers the reflected signal to the 3rd port P3 of the circulator 140. External high-frequency signals received by the antenna 110 are also supplied to the 2nd port P2 of the circulator 140 and transferred to the 3rd port P3. The high-frequency signals output from the 3rd port P3 are supplied to the rectifying part 130. The rectifying part 130 rectifies the input high-frequency signals and outputs a direct current. The output of the rectifying part 130 is connected to the output of the power supply unit 160, and further connected to a power source terminal 120S of the amplifying part 120. The power supply unit 160 is constituted of a primary battery or a secondary battery (hereinafter, both batteries are simply referred to as a battery) and a power source circuit thereof, for example, though not shown. Therefore, in the embodiment of FIG. 1, even when the amplifying part 120 is not in an operating state, the battery of the power supply unit 160 can be charged by a direct current obtained by the rectifying part 130 as long as external high-frequency signals are received by the antenna 110.

Assuming that the amplifying part 120 consumes a constant electric power in an arbitrary operation period, electric power supply from the power supply unit 160 may be smaller by the amount of electric power supplied from the rectifying part 130, so that exhaustion of the battery of the power supply unit 160 can be delayed. It is also possible to recharge the secondary battery of the power supply unit 160 during a period of small electric power consumption of the amplifying part 120 if an electric power from the rectifying part 130 has an extra power.

Although the embodiment of FIG. 1 describes an example of electric power feeding to the amplifying part 120, the radio communication device 100 generally includes a receiver, a display device or the like (not shown), and it is natural that the present invention is applicable to the electric power supply to such devices.

Figure 2A:
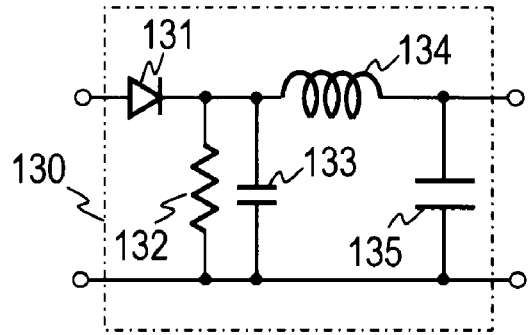
FIG. 2A shows a constitution example of a rectifying part.

FIG. 2 and FIG. 3 are views showing the detail constitution examples of the rectifying part 130. The rectifying part 130 of FIG. 2A is provided with a diode 131, a resistor 132, a capacitor 133, a coil 134 and a capacitor 135. The resistor 132, the capacitor 133 and the coil 134 form a smoothing circuit, and the diode 131 is serially connected between the input terminal of the rectifying part 130 and the smoothing circuit. The capacitor 135 is charged by a direct current signal obtained from the smoothing circuit. The smoothing circuit is designed to have a high impedance for a high-frequency signal.

Figure 2B:
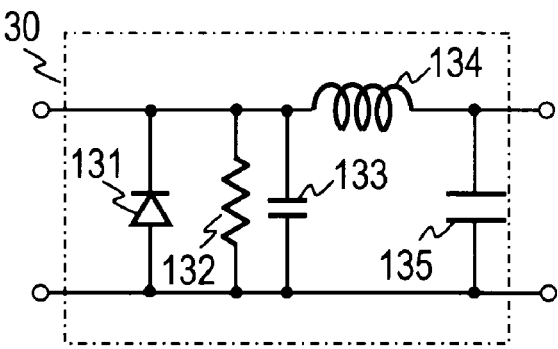
FIG. 2B shows another constitution example of the rectifying part.

Since the rectifying part 130 is constituted in this manner, it can perform rectification and smoothing when a high-frequency signal is inputted to the diode 131. Therefore, the high-frequency signal can be converted into a direct current signal. In the constitution of FIG. 2A, the diode 131 may be parallelly connected with the smoothing circuit as shown in FIG. 2B.

Herein, description will be briefly made for the characteristics of general diodes. A diode has a current capacity and its electric power conversion efficiency degrades if an input current is too small compared to the capacity (it becomes hard for a current to flow even in a forward direction). On the contrary, distortion occurs if the input current is too large compared to the capacity, distortion would be produced. The distortion is fed to the amplifying part 120 and re-radiated from the antenna, and the power conversion efficiency would decrease, or the diode may breakdown. Therefore, in the examples of a rectifying part 130' shown in FIGS. 3A and 3B, a switch 136, a diode 137, a power detector 138 and a comparator 139 are added. The diode 137 is parallelly connectable with the diode 131 via the switch 136. The power detector 138 detects the power of a signal input to the amplifying part 120 and provides the detected power to the comparator 139. The comparator 139 compares the detected power with a predetermined threshold value to decide whether or not the detected power is smaller than the threshold value, and gives the decision result as an On/Off control signal to the switch 136.

For example, a diode having a smaller current capacity than the diode 131 is used as the diode 137. In the case where the input signal power of the amplifying part 120 is smaller than the threshold value, the switch 136 is turned ON. In the case where the input signal power of the amplifying part 120 is equal to or greater than the threshold value, the switch 136 is turned OFF. By controlling the switch 136 in this manner, a current flows in the diode 137 when the input power to the rectifying part 130' is small, and the efficiency can be made higher. Further, in the case where the input power to the rectifying part 130' is large, the diode 137 having a small capacity which would easily cause to produce distortion, is cut off, so that occurrence of distortion or breakdown of the diode 137 can be prevented. Therefore, by using the rectifying part 130' of FIG. 3A or 3B, a high-frequency signal can be converted into a direct current power more efficiently.

Figure 3A:
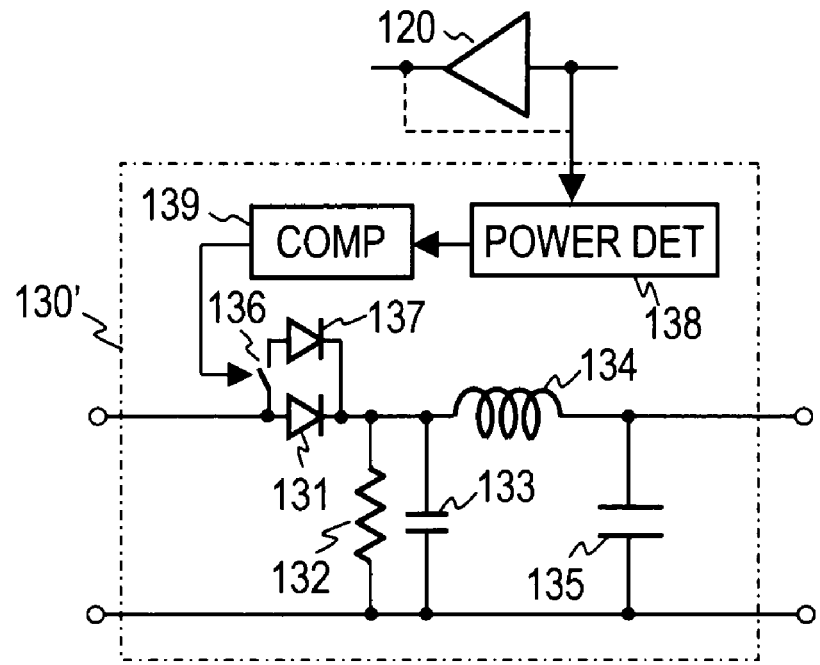
FIG. 3A is shows a constitution example of the rectifying part using two types of diodes.
Figure 3B:
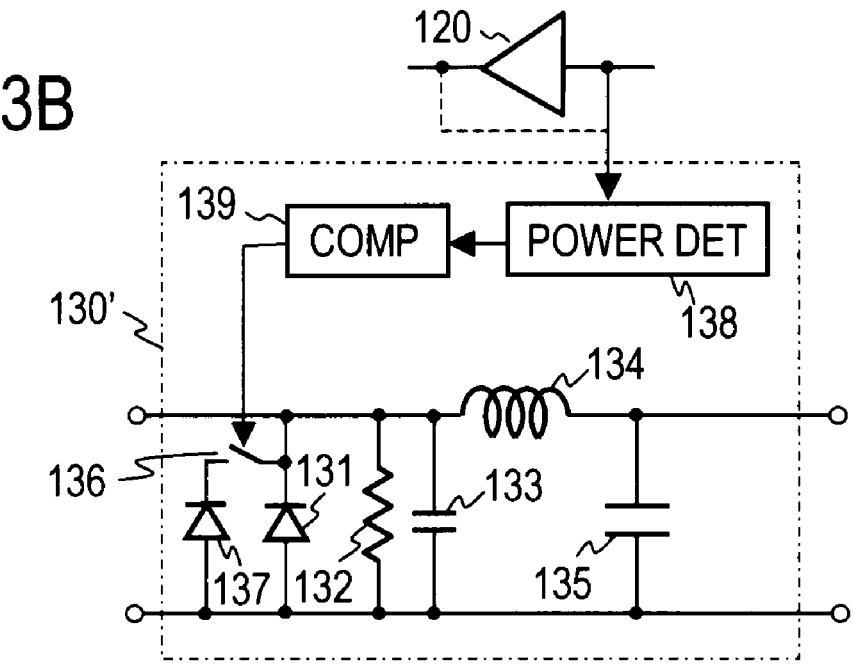
FIG. 3B shows another constitution example of the rectifying part using two types of diodes.

Although two types of diodes are used in the rectifying part 130' of FIGS. 3A and 3B, three types or more of diodes may be employed depending on the magnitude of an input to the rectifying part 130. Further, the above examples have been described for a case of monitoring the power of the input signal to the amplifying part 120, but as shown by the dashed line in FIGS. 3A and 3B, the output power of the amplifying part 120 may be monitored, or the power of the high-frequency signal given to the input terminal of the rectifying part (130, 130') may be monitored (not shown).

Figure 4:
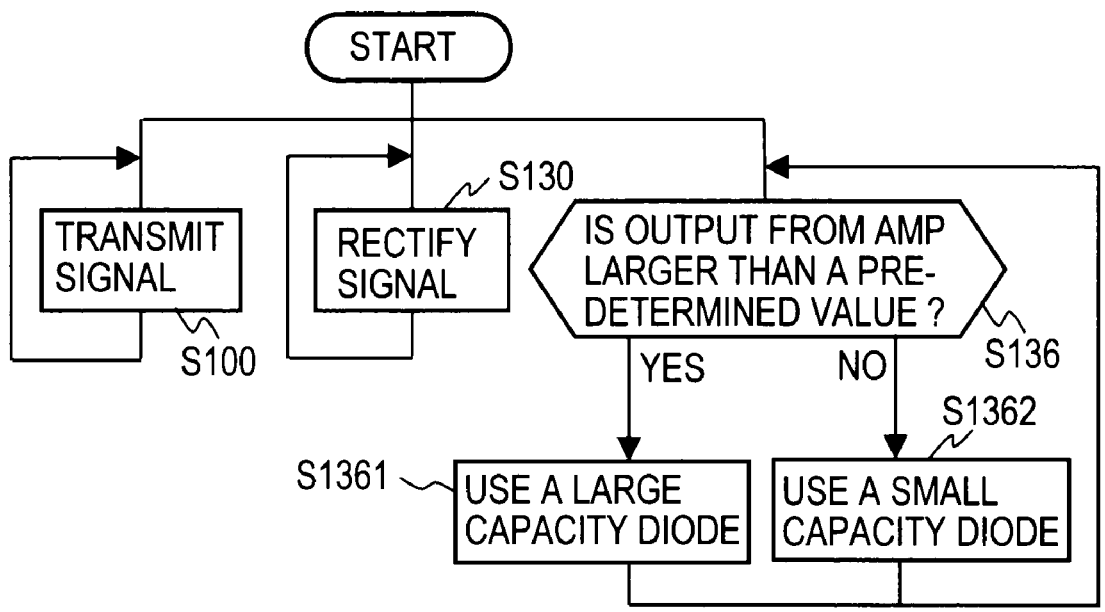
FIG. 4 shows an example of the processing flow of a radio communication device.

FIG. 4 shows an example of the processing flow of the radio communication device 100. A transmission signal is generated by the signal source 150, amplified by the amplifying part 120, passes the circulator 140, and is sent out from the antenna 110 (step S100). The transmission signal reflected by the antenna 110 is sent from the 2nd port P2 to the 3rd port P3 of the circulator 140, rectified by the rectifying part 130, and supplied to the constituent parts such as the amplifying part 120 (step S130). Such a processing flow is implemented when the rectifying part 130 of FIG. 2 is employed. In the case where the rectifying part 130' of FIG. 3 is employed, the rectifying part 130 judges whether or not the output power of the amplifying part 120 is larger than a predetermined value (step S136). If the judgment result is Yes, the switch 136 is turned OFF, and the diode 131 having a large current capacity is used (step S1361). In the case where the judgment result is No in step S136 is No, the switch 136 is turned ON, and the diode 137 having a small current capacity is used (step S1362).

Consequently, according to the radio communication device 100 of the present invention, even if reflection of the transmission signal is produced by the antenna due to the change in its environment, the device can convert the reflected transmission signal into an electric power to reuse it. Therefore, a radio communication device with a high power utilization efficiency can be provided.

Modified Embodiment

The above-mentioned description shows an example using the output current of the rectifying part 130 as an aid to power supply to the amplifying part 120 for transmitting a high-frequency signal, but a subject of electric power feeding is not limited thereto. A radio communication device generally includes a receiver and a display device other than the constitution parts shown in FIG. 1. Further, some of recent multifunctional mobile phones which can operate as radio equipment are provided with various functions such as a digital camera function, an Internet connection function, a game function, and an IC card function (credit card function) in addition to a conversation function and an e-mail function. Therefore, ICs which implement such functions as a data-processing device, a memory for holding processing data, and a memory for storing programs to execute functions are used in a mobile phone. Some of those ICs acting as functional constituent parts may have extremely small power consumption.

Figure 5:
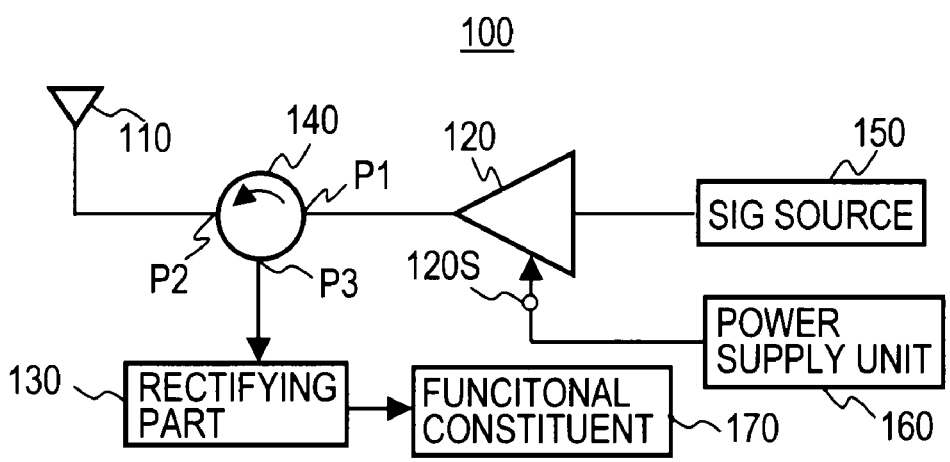
FIG. 5 shows a constitution example of a radio communication device which makes use of a high-frequency electric power from an antenna for power supply to a desired functional constituent part.

FIG. 5 shows a modification of the embodiment of FIG. 1, wherein the rectifying part 130 is dedicated to power supply to functional constituent parts 170 having small power consumption. In this modified embodiment, only the power supply unit 160 feeds electric power to the amplifying part 120. Therefore, even if the remaining amount of the battery of the power supply unit 160 becomes smaller than a specified value to result in a transmission-unable state (communication function-unable state), electric power supply from the capacitor 135 acting as a condenser of the rectifying part 130 (refer to FIG. 2) can sustain particular functions such as an IC card function and a data holding function of a memory, for example, if external high-frequency signals are received.

Second Embodiment

Figure 6:
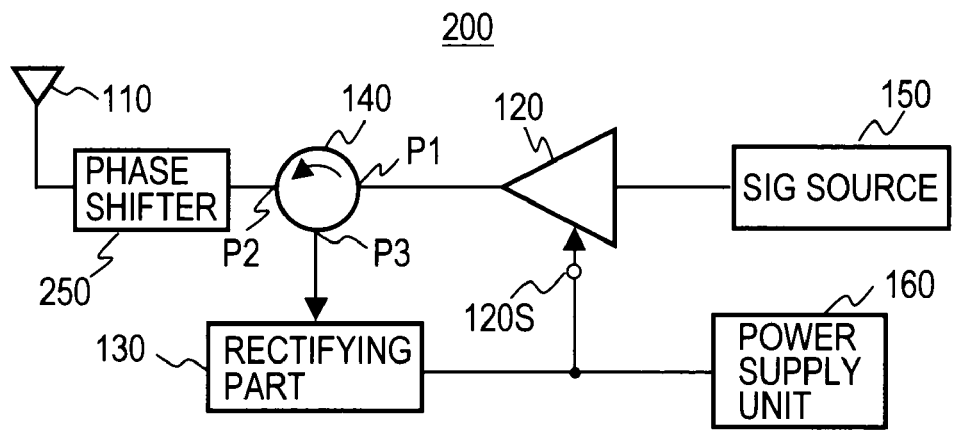
FIG. 6 shows a functional constitution example of the radio communication device of a second embodiment.

FIG. 6 shows a functional constitution example of the radio communication device of the second embodiment. A radio communication device 200 is different from the radio communication device 100 of FIG. 1 in that a phase shifter 250 is provided between the circulator 140 and the antenna 110. The circulator 140 transfers a signal inputted to the 1st port P1 to the 2nd port P2. However, a trace amount of the signal inputted to the 1st port P1 leaks to the 3rd port P3. The phase shifter 250 aligns the phase of the reflected wave from the antenna 110 with the phase of a transmission signal leaked to the 3rd port P3, in phase, or at least adjusts the two phases not to be in reverse relation to each other. Since this makes it possible to convert the reflected wave and the leaked transmission signal into an electric power, power utilization efficiency can be further increased.

Modified Embodiment

Figure 7:
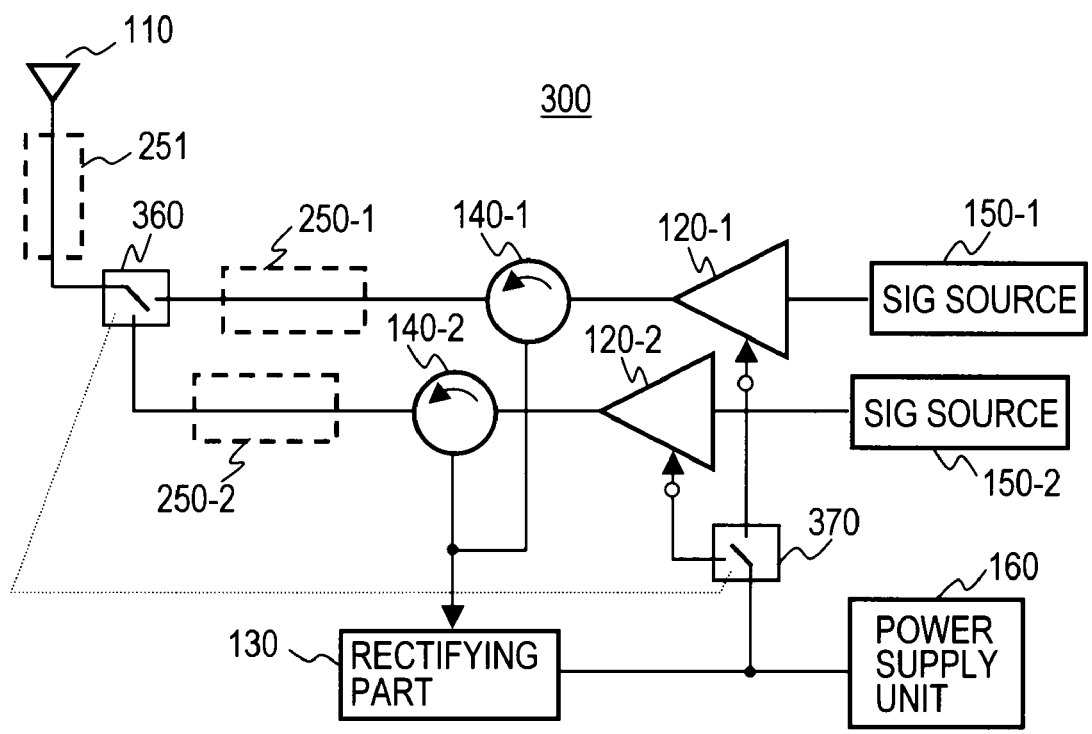
FIG. 7 shows a functional constitution example of a modified radio communication device of the second embodiment.

FIG. 7 shows a functional constitution example of the radio communication device in which carriers of a plurality of frequency bands share a single antenna. A radio communication device 300 is provided with an amplifying part 120-*n* (n is 1 or 2 in the example of FIG. 7), a circulator 140-*n* and a signal source 150-*n* for each frequency band. Further, the antenna 110 is selectively connected to either one of the circulators (140-1, 140-2) by a switch 360. With such a constitution of sharing a single antenna by carriers of a plurality of frequency bands, the power utilization efficiency can be enhanced. Although FIG. 7 shows the case of using two carrier frequency bands, the number of the amplifying parts 120-*n*, the circulators 140-*n* and the signal sources 150-*n* should only be increased (n is 3 or more) in the case of using three or more carrier frequency bands in the same manner. In the constitution of FIG. 7, a switch 370 that operates in synchronism with the switch 360 is further provided to selectively supply to one of the amplifying parts 120-1, 120-2. As a result, wasteful consumption of electric power in the non-selected amplifying parts can be avoided by feeding the electric power only to the amplifying part 120-*n* corresponding to the frequency band selected by the switch 360.

In the radio communication device 300, the phase shifter 250-*n* may be provided between the circulator 140-*n* and the switch 360 as shown by the dashed line in FIG. 7. In this case, adjustment of the phase shifters 250-*n* for aligning the phase of the reflected wave with the phase of the leaked transmission signal must be performed for each carrier. Each phase shifter 250-*n* aligns the phase of a transmission signal reflected by the antenna 110 with the phase of the transmission signal leaked from the 1st port to the third terminal of each circulator 140-*n*, in phase, or at least sets both the phases not to be in reverse relation to each other. The power utilization efficiency can be further increased if the phase shifters are provided in this manner. Alternatively, instead of the variable phase shifters 250-*n*, a phase shifter 251 may be inserted between the antenna 110 and the switch 360, as shown by the dashed line, to adjust the phase of a transmission signal reflected by said antenna so as not to be in reverse relation with the phase of a transmission signal leaked from the first port to the third port of the circulator in the frequency band selected by the switch.

Third Embodiment

Figure 8:
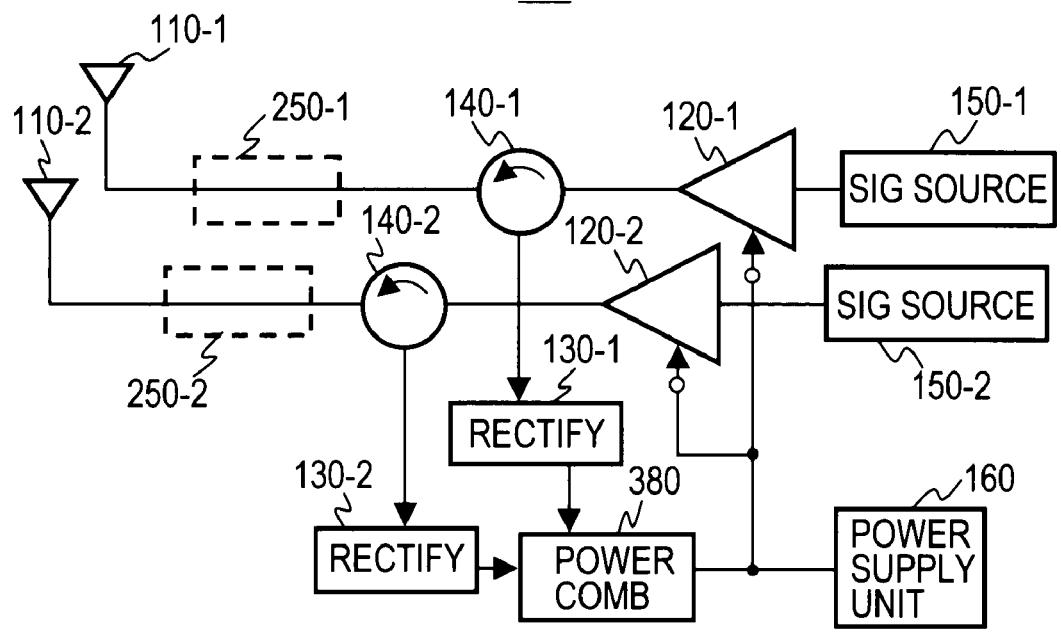
FIG. 8 shows a functional constitution example of the radio communication device of a third embodiment.

FIG. 8 shows an embodiment in which the present invention is applied to a radio communication device that is simultaneously communicable in different frequency bands using a plurality of antennas, for example. A radio communication device 400 is provided with plural sets of the antenna 110-*n*, the amplifying part 120-*n*, the circulator 140-*n*, the rectifying part 130-*n* and the signal source 150-*n* (n is 1 or 2) employed in the radio communication device 100 (FIG. 1). Further, outputs from the rectifying parts 130-*n* are combined by a power combiner 380, and the combined power is used as an aid to power supply to each amplifying part 120-*n*. Since the radio communication device 400 has such a constitution, the power utilization efficiency can be increased similarly to the radio communication device 100.

Although FIG. 8 shows the case where the number of antennas is two, the sets of the antenna 110-*n*, the amplifying part 120-*n*, the circulator 140-*n*, the rectifying part 130-*n* and the signal source 150-*n* should only be increased (n is 3 or more) in the case of using three or more antennas in the same manner.

Further, as shown by the dashed line in FIG. 8, a phase shifter 250-*n* may be provided between each circulator 140-*n* and antenna 110-*n*. Each phase shifter 250-*n* aligns the phase of the transmission signal reflected by each antenna 110-*n* with the phase of the transmission signal leaked from the 1st port to the 3rd port of each circulator 140-*n* in phase, or at least sets both the phases not to be in reverse relation to each other. The power utilization efficiency can be further increased if the phase shifters 250-*n* are provided in this manner.

Fourth Embodiment

Figure 9:
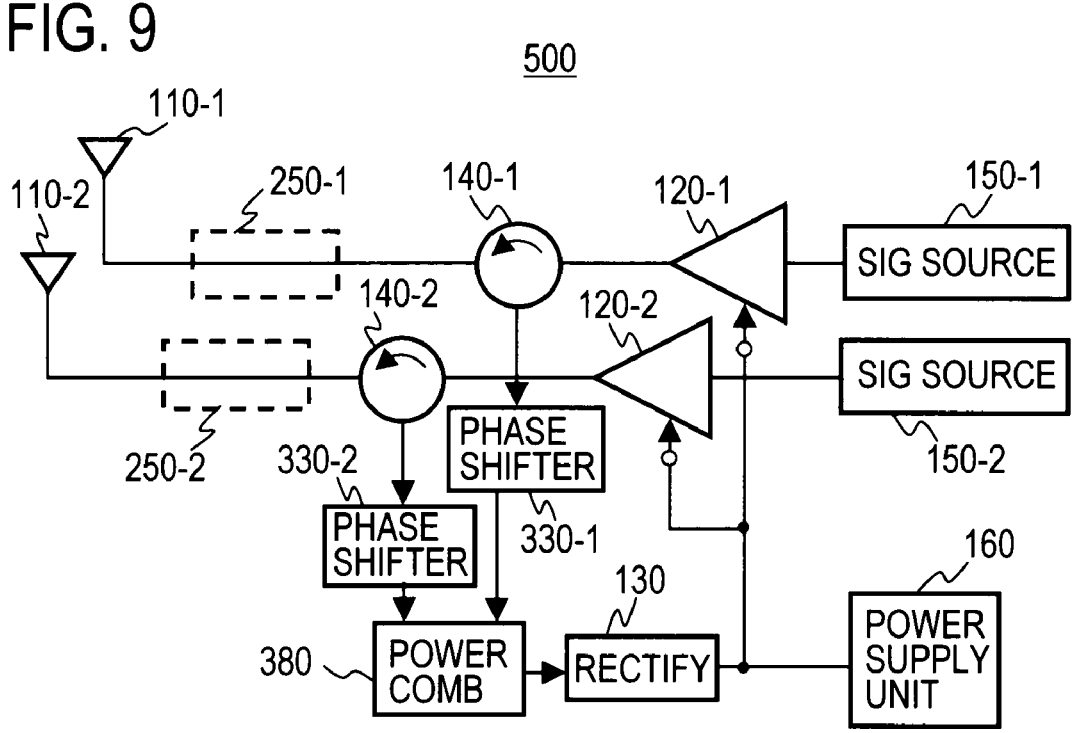
FIG. 9 shows a functional constitution example of the radio communication device of a fourth embodiment.

FIG. 9 shows a functional constitution of the radio communication device in the case where a plurality of antennas are used for the same frequency band. The carrier frequency bands of the signal sources 150-*n* (n is 1 or 2) in FIG. 9 should be the same. A radio communication device 500 is provided with plural sets of the antenna 110-*n*, the circulator 140-*n*, the amplifying part 120-*n* and the signal source 150-*n* shown in FIG. 6. In addition, plural phase shifters 330-*n* and a power combiner 380 are also provided.

What is significantly different from the radio communication device 200 is that the phase shifters 330-*n* are connected each between the 3rd ports of the corresponding one of the circulators 140-*n* and the power combiner 380. High-frequency signals outputted from the phase shifters 330-*n* are power-combined by the power combiner 380, and the combined signal is supplied to the rectifying part 130. The phase shifters 330-*n* align the phases of the transmission signals (reflected waves) reflected by the antennas 110-*n* so as to enhance each other the intensities of the signals input to the power combiner 380, or set the phases at least not in reverse relation to each other so as not to weaken the intensities of the input signals to the power combiner 380. The rectifying part 130 converts the high-frequency signal combined by the power combiner 380 into a direct current power which is used as an aid to the power supply to the amplifying parts 120-*n*.

Since the radio communication device 500 basically aligns the phases of the reflected waves from a plurality of antennas so as to enhance each other, it can efficiently convert the reflected waves into the direct current power. Therefore, the power utilization efficiency can be increased.

Although FIG. 9 shows the case where the number of antennas is two, the sets of the antenna 110-*n*, the amplifying part 120-*n*, the circulator 140-*n*, the signal source 150-*n* and the phase shifter 330-*n* should only be increased (n is 3 or more) in the case where three or more antennas are used in the same manner.

Further, as shown by the dashed line in FIG. 9, phase shifters 250-*n* may be provided each between corresponding circulator 140-*n* and antenna 110-*n*. Each phase shifter 250-*n* aligns the phase of the transmission signal reflected by the corresponding antenna 110-*n* with the phase of the transmission signal leaked from the 1st port to the 3rd port of the corresponding circulator 140-*n*, in phase, or at least sets both the phases to be not in reverse relation to each other. The power utilization efficiency can be further increased if the phase shifters 250-*n* are provided in this manner.

In each embodiment of the above-mentioned FIGS. 6 to 9, the output from the rectifying part 130 (or the output of the power combiner 380 in the case of FIG. 8) may be fed to a desired functional constituent part (not shown) other than the amplifying part(s) 120-*n* of the radio communication device in the same manner as in FIG. 5.

If variable phase shifters are employed as phase shifters 250-*n* used in each embodiment, the phase of the reflected signal can be changed following the dynamic impedance variation at antennas.

Effect of the Invention

According to the present invention, even if a high-frequency transmission signal is reflected by the antenna, the reflected signal can be converted into a reusable electric power. Therefore, it is possible to provide a radio communication device with higher power utilization efficiency than a conventional device in which the reflected wave is consumed by converting it into heat or the like. Further, by aligning the phases of a plurality of high-frequency signals using phase shifters and combining them, the power utilization efficiency can be further increased.

What is claimed is:

1. A radio communication device, comprising:
a signal source that generates a transmission signal;
an antenna;
a high-frequency power amplifying part that supplies the transmission signal to said antenna;
a rectifying part that converts a high-frequency signal into a direct current power;
a circulator having a first port connected to the output of said high-frequency power amplifying part, a second port connected to said antenna and a third port connected to said rectifying part, and configured such that an input from the first port is outputted to the second port, and an input from the second port is outputted to the third port; and
a power supply unit that feeds electric power at least to said high-frequency power amplifying part; and
a phase shifter, inserted between said antenna and the second port of said circulator, that adjusts a phase of a transmission signal reflected by said antenna so as not to be in reverse relation with a phase of a transmission signal leaked from the first port to the third port of said circulator,
wherein a direct current power from said rectifying part is supplied to at least one of said high-frequency power amplifying part and another functional constituent part in said radio communication device.

2. The radio communication device according to claim 1, wherein multiple sets of said signal source, said high-frequency power amplifying part, said circulator and said phase shifter are provided each for different frequency bands of transmission signals, said radio communication device further comprising:
a first switch that selects one of said multiple sets and supplies a transmission signal from the phase shifter in the selected set to said antenna, and a second switch that supplies at least one of the electric power from said power supply unit and the direct current power from said rectifying part to said high-frequency power amplifying part in the selected one of the sets.

3. The radio communication device according to claim 1, wherein multiple sets of said signal source, said high-frequency power amplifying part and said circulator are provided each for different frequency bands of transmission signals, said radio communication device further comprising:
a first switch that selects one of said multiple sets and supplies a transmission signal from the second port of said circulator in the selected set to said antenna, and a second switch that supplies the electric power from said power supply unit and/or the direct current power from said rectifying part to said high-frequency power amplifying part in the selected one of the sets, and a variable phase shifter is provided as said phase shifter between said antenna and said first switch, and is configured to adjust the phase of a transmission signal reflected by said antenna so as not to be in reverse relation with the phase of a transmission signal leaked from the first port to the third port of the circulator in the frequency band selected by the first switch.

4. The radio communication device according to claim 1, wherein multiple sets of said signal source, said high-frequency power amplifying part, said circulator, said phase shifter, said antenna and said rectifying part are provided, said radio communication device further comprising:

a power combiner that combines outputs from said rectifying parts in the multiple sets and supplies the combined power to at least one of said high-frequency power amplifying parts and said functional constituent part.

5. The radio communication device according to claim 1, wherein multiple sets of said signal source, said high-frequency power amplifying part, said circulator, said phase shifter and said antenna are provided, said radio communication device further comprising:

a plurality of further phase shifters each connected to the third port of said circulator in corresponding one of said multiple sets, and a power combiner that combines outputs from said plurality of further phase shifters and supplies a combined output to said rectifying part;

wherein carrier frequency bands of transmission signals outputted from said high-frequency power amplifying parts of said multiple sets are equal to each other; and said further phase shifters are configured to adjust the phases of transmission signals reflected by said antennas so as not to be in reverse relation with each other.

6. The radio communication device according to any one of claims 1, 2, 3, 4 and 5, wherein said rectifying part comprises two or more diodes having different current capacities for which ranges of output power levels are predetermined, and said rectifying part is configured such that one of the diodes for which an electric power corresponding to input power or output power of said high-frequency power amplifying part falls in corresponding one of the ranges, is selectively made operable as a rectifier of said rectifying part.

7. An electric power feeding method of a radio communication device that includes a signal source that generates a transmission signal, an antenna, a high-frequency power amplifying part that supplies the transmission signal to said antenna, a rectifying part that converts a high-frequency signal into a direct current power, a circulator having a first port connected to the output of said high-frequency power amplifying part, a second port connected to said antenna and a third port connected to said rectifying part, and configured such that an input from the first port is outputted to the second port, and an input from the second port is outputted to the third port, and a power supply unit that feeds electric power at least to said high-frequency power amplifying part, wherein a direct current power from said rectifying part is supplied to at least one of said high-frequency power amplifying part and another functional constituent part in said radio communication device, said method comprising steps of:

sending out a high-frequency signal from said high-frequency power amplifying part to said antenna via said circulator;

sending a high-frequency signal reflected from said antenna to said rectifying part;

converting the reflected high-frequency signal into a direct current power; and adjusting, by a phase shifter provided between the antenna and the circulator, a phase of a transmission signal reflected by said antenna so as not to be in reverse relation with the phase of a transmission signal leaked from the first port to the third port of said circulator.

8. The electric power feeding method of a radio communication device according to claim 7, wherein said rectifying part comprises two or more diodes of different current capacities, and said converting step comprises a step of selecting one of the diodes in said rectifying part in accordance with an input power or output power of said high-frequency power amplifying part.

* * * * *